Nov. 3, 1953 R. R. REED 2,657,802
MATERIAL SEPARATOR
Filed Dec. 30, 1949 3 Sheets-Sheet 1
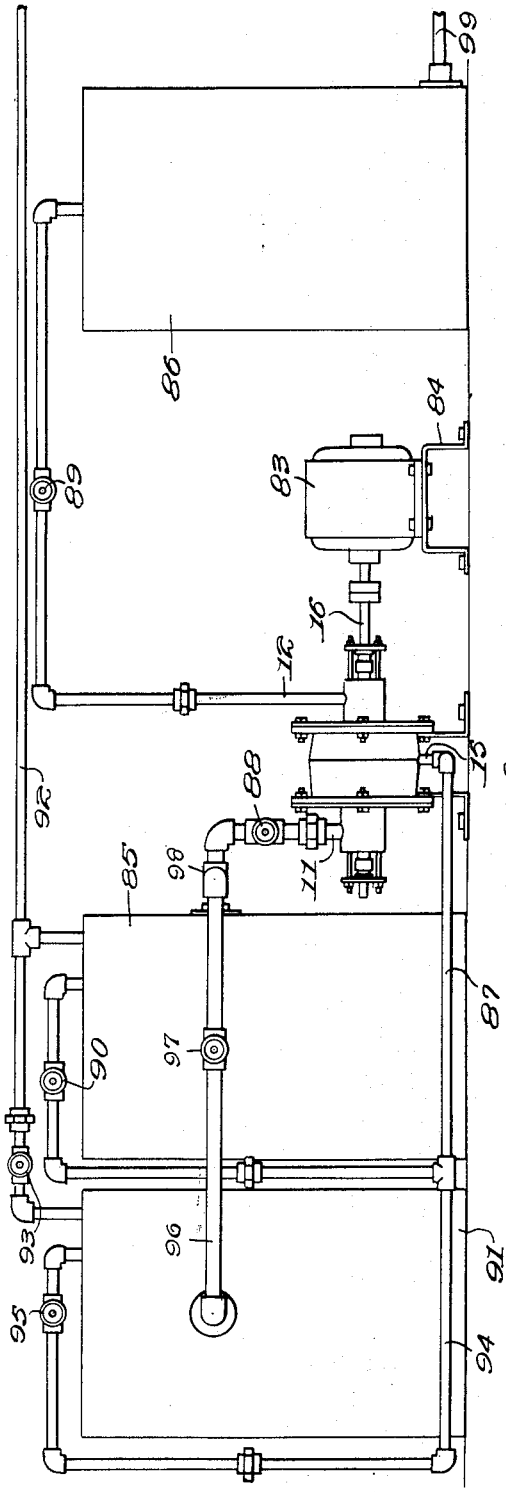
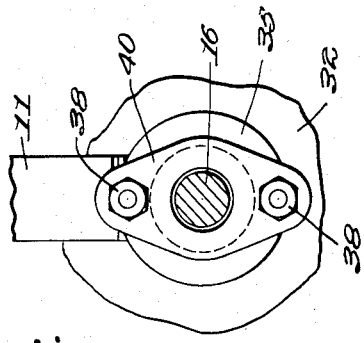
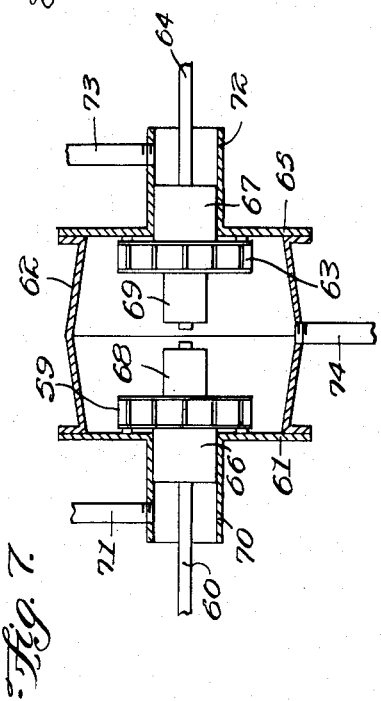
INVENTOR.
Robert R. Reed,
BY Victor J. Evans & Co.
ATTORNEYS Nov. 3, 1953 R. R. REED 2,657,802
MATERIAL SEPARATOR
Filed Dec. 30, 1949 3 Sheets-Sheet 2

INVENTOR.
Robert R. Reed,
BY Victor J. Evans & Co.
ATTORNEYS

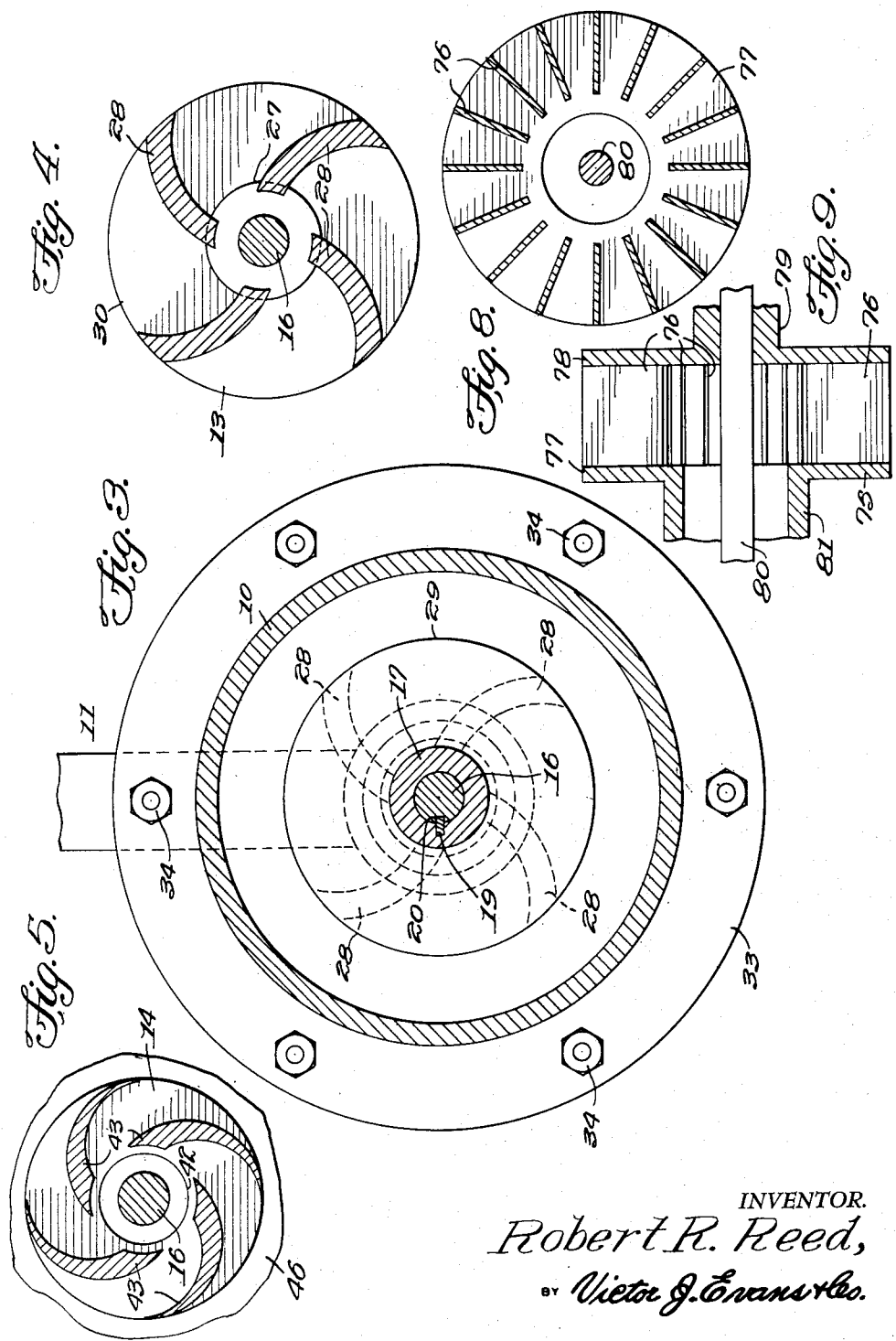

Patented Nov. 3, 1953

2,657,802

UNITED STATES PATENT OFFICE 2,657,802

MATERIAL SEPARATOR

Robert R. Reed, Tulsa, Okla.

Application December 30, 1949, Serial No. 136,123

4 Claims. (Cl. 210—51)

This invention relates to material separating machines particularly adapted for separating solids from liquids, or for separating materials having different specific gravities and may also be used for separating gases and other materials, and in particular the invention relates to a machine having a housing with a cylindrical chamber therein with spaced aligned impellers rotating at the same speed or at different speeds and turning in the same direction or in opposite directions, and the housing is provided with a suction connection entering through one of the impellers and a discharge connection through the other impeller with an outlet port through which particles rejected by the impeller having the discharge connection therethrough are returned to a supply hopper.

The purpose of this invention is to provide means for mechanically separating solids from liquids, liquids from liquids, liquids from gases, and gases from gases, and particularly for recovering commercial drilling mud in oil well drilling and for refining oil well drilling mud by separating cuttings and the like therefrom.

Commercial material separating devices are usually in the form of settling tanks and although agitating means is provided the final product is obtained by a settling process, which requires time and numerous steps. With this thought in mind this invention contemplates a material separating unit in which the separation, particularly of solids from liquids is obtained by centrifugal action created by a plurality of rotating impellers in an agitating chamber wherein the products are drawn in through one impeller and the products desired are discharged through another impeller.

The object of this invention is, therefore, to provide means for arranging a plurality of rotating impellers in a common housing wherein elements or products subjected to the impellers are separated and the separated products discharged through different outlets.

Another object of the invention is to provide a separator for separating products by centrifugal action resulting from rotating impellers which may be arranged to handle different types of products.

A further object of the invention is to provide a material separator wherein products are separated by rotating elements which is of a comparatively simple and economical construction.

With these and other objects and advantages in view the invention embodies a plurality of impellers carried by the same or aligned shafts with material to be separated supplied through one impeller, the desired product discharged through another impeller and the unwanted materials discharged through a side outlet.

Other features and advantages of the invention will appear from the following description taken in connection with the drawings wherein:

Figure 1 is a view showing a side elevation illustrating a typical arrangement of the apparatus with the separator connected to suitable tanks or containers.

Figure 3 is a cross section through the separating unit taken on line 3—3 of Figure 2.

Figure 4 is a detail taken on line 4—4 of Figure 2 showing a section through the suction impeller.

Figure 5 is a similar detail taken on line 5—5 of Figure 2 showing a section through the discharge impeller.

Figure 6 is a detail showing an end view of the housing taken on line 6—6 of Figure 2.

Figure 7 is a longitudinal section similar to that shown in Figure 2 illustrating a modification wherein the impellers are mounted on separated shafts.

Figure 8 is a cross section through an impeller similar to that shown in Figures 4 and 5 illustrating a further modification wherein the impeller is formed with straight radially disposed vanes.

Figure 9 is a longitudinal section through the impeller shown in Figure 8.

Figure 2:
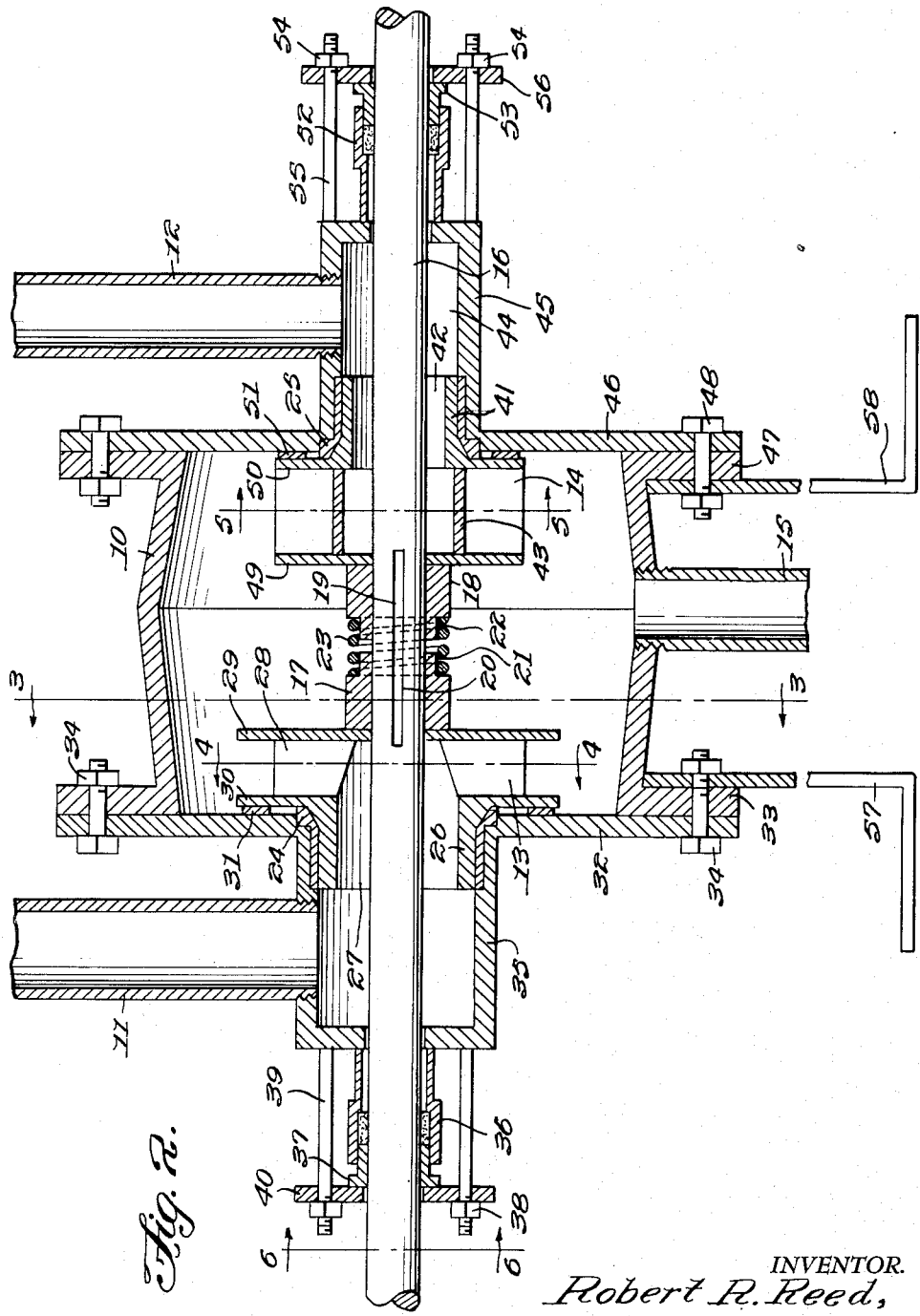
Figure 2 is a longitudinal section through the separator illustrating the general construction thereof.

Referring now to the drawings wherein like reference characters denote corresponding parts the material separator of this invention includes a housing 10 having a suction connection 11 and a discharge connection 12 with a suction impeller 13, a discharge impeller 14, and an outlet port 15.

In the design shown in Figures 1 and 2 the impellers are mounted on a common shaft 16 which extends through the housing and the impellers are mounted on the shaft through collars 17 and 18 that are keyed to the shaft by a common key 19 in a keyway 20. The collars are provided with inner ends 21 and 22, respectively in which the ends of a compression spring 23 are seated, and as shown in Figure 2, the spring urges the collars outwardly holding the impellers against the bearings 24 and 25, respectively, by which the impellers are journaled in the housing.

The impeller 13 is provided with a hub 26 which is formed with a centrally disposed opening 27 through which products from the suction connection 11 are drawn into the housing by the impeller blades 28. The impeller blades are positioned between an outer flange 29 and an inner flange 30 and a thrust ring 31 is provided between the flange 30 and an end plate 32 of the housing which is secured to the flange 33 of the housing 10 by bolts 34. The end plate 32 of the housing is formed with a cylindrical hub 35 from which the suction connection 11 extends and a packing gland 36 extends outwardly from the end of the hub with a bushing 37 urged into the gland by a nut 38 on bolts 39 which hold a washer 40 against the outer surface of the bushing.

The impeller 14 is provided with a similar hub 41 which is also provided with a centrally disposed opening 42 that provides communicating means between the impeller blades 43 and the opening 44 in the cylindrical hub 45 that extends from the end plate 46 that is secured to the gland 47 of the housing 10 by bolts 48. The impeller blades 43 are mounted between flanges 49 and 50 and a thrust washer 51 is provided between the flanges 50 and the end plate 46.

A packing gland 52 is also provided on the end of the hub 45 and a bushing 53 of this packing gland is urged into the gland by nuts 54 on bolts 55 which hold the washer 56 against the outer end of the bushing.

The housing 10 may be supported by angles 57 and 58 which, as shown in Figure 2 are secured to the flanges 33 and 47 of the housing by the bolts 34 and 48, respectively.

In the design shown in Figure 7 an impeller 59 is mounted on a shaft 60 in an end plate 61 of a housing 62 and another impeller 63 similar to the impeller 14 is mounted on a shaft 64 in an end plate 65 of the housing. In this design the impellers are journaled in the end plates of the housing by bearings 66 and 67 and the impellers are mounted on the shafts through hubs or collars 68 and 69, respectively. The hub 70 of the end plate 61 is provided with a suction connection 71 and the hub 72 of the end plate 65 is provided with a discharge connection 73. The housing 62 may be provided with an outlet port 74 similar to the port 15 of the housing 10.

With the parts arranged in this manner the impellers may be rotated in the same or in opposite directions and they may be rotated at the same or at different speeds. It has been found that different results are accomplished by rotating the discharge impeller at a speed slower than that of the suction impeller and this provides more efficient separation for different products. It has also been found that more efficient separation of some products is obtained with the propellers rotating in opposite directions. It will be understood therefore, that the impellers may rotate in the same or in opposite directions and may rotate at the same speed or at different speeds.

In the design illustrated in Figures 8 and 9 an impeller 75 with straight vanes 76, is illustrated and the vanes are positioned between flanges 77 and 78 with the flange 78 provided with a hub 79 through which the impeller is mounted on a shaft 80, and the flange 75 provided with a cylindrical hub 81 through which materials are supplied to the vanes of the impeller. It will be understood that impellers of different types may be used.

As illustrated in Figure 1 the separator may be used in combination with containers, tanks, hoppers, vats, or open pits and with the shaft 16 connected directly to a motor 83, on a stand 84 the suction connection 11 may extend to a tank 85 with a discharge connection 12 extended to a tank 86 and the outlet port 15 extended through a return connection 87 to the upper end of the tank 85. The suction connection 11 is provided with a valve 88, the discharge connection with a valve 89, and the outlet connection with a valve 90.

It will be understood that the separator may be used in combination with a battery of tanks and, as illustrated in Figure 1 the tank 85 may be connected to another tank 91 and both tanks may be supplied with materials to be separated through a supply connection 92, a valve 93 being provided in the connection to the tank 91. The tank 91 is also connected to the outlet connection 15 through a pipe 94 and this pipe is provided with a valve 95.

The tank 91 is also connected to the suction connection 11 by a pipe 96, which is provided with a valve 97, and this pipe may enter the connection 11 through a valve 98 whereby material may be drawn from either the tank 85 or the tank 91, or from any suitable number of tanks.

With the parts arranged in this manner separated material passing through the impeller 14, which is the discharge impeller passes to the tank 86 from which it may be drawn through a connection 99 to storage or the like. With the parts connected in this manner the unwanted materials are returned through the connection 15. However, for some uses it may be desired to use the product discharged through the outlet port 15 and return unwanted products through the discharge connection 12.

The principle of operation is a combined function of pressure differences created by the various power impellers providing a force to move all materials through the complete cycle and the action of the opposing impeller blades to effectively prevent passage of undesirable substances beyond that point. The spinning blades of the opposing impeller act as a barrier to passage of substances of larger size and/or greater densities by imparting to these substances a force sufficiently great enough to keep them in the outer regions of the pump casing at which point they are drawn out of the casing and returned to the recirculating tank. The desired substance is forced through the opposing impeller and drawn off from the center of the opposing impeller and forced into the main tank where it is again usable for the process at hand. The pressure necessary to force the movement of the desired and undesired substances is created by the main or power impeller or impellers.

The rotating impellers may be of different types or designs and may rotate in unison with both turning in the same direction and at the same speed or they may rotate in opposite directions also at the same or at different speeds and with the different combinations the separator may be used for separating solids from liquids such as sand from oil, sand from starch, sand from drilling muds, sand from water, shale from oils, shale from drilling muds, shale from starch, bottom sediment from oils, oil bearing sands from water, drilling muds or starch and metal bearing ores from sand and water.

The impellers may also be arranged to separate liquids from liquids, liquids from gases, and gases from gases, as may be desired.

It will be understood that other modifications may be made in the design and arrangement of the parts without departing from the spirit of the invention.

What is claimed is:

1. In a material separator, the combination which comprises a housing having an open chamber therein, a shaft mounted in the housing and extended through said chamber, said housing having suction and discharge connections, spaced parallel flanges mounted on said shaft and positioned against the end of the chamber in which the suction connection of the housing is positioned, radially disposed blades positioned between said spaced parallel flanges and integral therewith, said flanges and blades providing a suction impeller and the area through said impeller being in communication with said suction connection, spaced parallel flanges mounted on said shaft and positioned in the end of the chamber opposite to that in which the suction impeller is positioned, and radially disposed blades positioned between said spaced parallel flanges at the end of the chamber opposite to that in which the suction impeller is positioned and integral with said flanges, said blades and flanges in the end of the chamber opposite to that in which the suction impeller is positioned providing a discharge impeller and the area through said discharge impeller being in communication with the discharge connection of the housing, the diameter of the flanges of said discharge impeller being less than that of the flanges of the suction impeller.

2. In a material separator, the combination which comprises a housing having an open chamber therein, a shaft mounted in the housing and extended through said chamber, said housing having suction and discharge connections, spaced parallel flanges mounted on said shaft and positioned against the end of the chamber in which the suction connection of the housing is positioned, radially disposed blades positioned between said spaced parallel flanges and integral therewith, said flanges and blades providing a suction impeller and the area through said impeller being in communication with said suction connection, spaced parallel flanges mounted on said shaft and positioned in the end of the chamber opposite to that in which the suction impeller is positioned, radially disposed blades positioned between said spaced parallel flanges at the end of the chamber opposite to that in which the suction impeller is positioned and integral with said flanges, said blades and flanges in the end of the chamber opposite to that in which the suction impeller is positioned providing a discharge impeller and the area through said discharge impeller being in communication with the discharge connection of the housing, the diameter of the flanges of said discharge impeller being less than that of the flanges of the suction impeller, and resilient means positioned between the impellers for urging the impellers toward the ends of the chamber.

3. In a material separator, the combination which comprises a housing having an open chamber therein, a shaft mounted in the housing and extended through said chamber, said housing having suction and discharge connections, spaced parallel flanges mounted on said shaft and positioned against the end of the chamber in which the suction connection of the housing is positioned, radially disposed blades positioned between said spaced parallel flanges and integral therewith, said flanges and blades providing a suction impeller and the area through said impeller being in communication with said suction connection, spaced parallel flanges mounted on said shaft and positioned in the end of the chamber opposite to that in which the suction impeller is positioned, and radially disposed blades positioned between said spaced parallel flanges at the end of the chamber opposite to that in which the suction impeller is positioned and integral with said flanges, said blades and flanges in the end of the chamber opposite to that in which the suction impeller is positioned providing a discharge impeller and the area through said discharge impeller being in communication with the discharge connection of the housing, the diameter of the flanges of said discharge impeller being less than that of the flanges of the suction impeller, said impellers being oppositely disposed.

4. In a material separator, the combination which comprises a housing having an open chamber therein, aligned shafts journaled in the ends of the housing and positioned with ends thereof extended into said chamber, said housing having suction and discharge connections extended through the journaling means of the shafts, spaced parallel flanges mounted on the shaft extended through said suction connection and positioned in the end of the chamber from which said suction connection extends, radially disposed blades positioned between the spaced parallel flanges and integral therewith providing a suction impeller, the area through said suction impeller being in communication with the suction connection, spaced parallel flanges mounted on the shaft extended through the discharge connection of the housing and positioned with one of said flanges against the end of the housing through which the discharge connection extends, radially disposed blades positioned between the spaced parallel flanges in the discharge end of the housing and integral with said flanges, said blades in combination with the flanges positioned in the discharge end of the housing providing a discharge impeller and the area through said discharge impeller being in communication with the discharge connection of the housing, the diameter of said discharge impeller being less than that of the suction impeller and the speed of the discharge impeller being less than that of the suction impeller.

ROBERT R. REED.

References Cited in the file of this patent

UNITED STATES PATENTS

| Number | Name | Date |
|---|---|---|
| 652,594 | Cook | June 26, 1900 |
| 671,517 | McDaniel | Nov. 19, 1907 |
| 925,856 | Wilder | June 22, 1909 |
| 1,262,146 | Ward | Apr. 9, 1918 |
| 1,541,163 | Westhafer et al. | June 9, 1925 |
| 1,664,769 | Chance | Apr. 3, 1928 |
| 1,747,155 | Birdsall | Feb. 18, 1930 |
| 1,900,394 | Cottrell | Mar. 7, 1933 |
| 2,336,150 | Horvath | Dec. 7, 1943 |
| 2,510,781 | Howard | June 6, 1950 |
| 2,515,398 | Derocher | July 18, 1950 |

FOREIGN PATENTS

| Number | Country | Date |
|---|---|---|
| 312,271 | Great Britain | Mar. 13, 1930 |
| 377,353 | Great Britain | July 28, 1932 |